(12) United States Patent  
Chayanam et al.

(10) Patent No.: US 8,136,148 B1  
(45) Date of Patent: Mar. 13, 2012

(54) REUSABLE AUTHENTICATION EXPERIENCE TOOL

(75) Inventors: Pavan Chayanam, Walnut Creek, CA (US); Todd Inskeep, Charlotte, NC (US); Eric William Miller, Issaquah, WA (US); Clay Newton, Napa, CA (US); David Charles Shroyer, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 853 days.

(21) Appl. No.: 12/100,170

(22) Filed: Apr. 9, 2008

(51) Int. Cl.
| | |
|---|---|
| G06F 15/16 | (2006.01) |
| G06F 9/00 | (2006.01) |
| G06F 17/30 | (2006.01) |
| H04L 29/06 | (2006.01) |
| G06F 21/00 | (2006.01) |
| G06F 7/04 | (2006.01) |
| G06F 3/00 | (2006.01) |
| G06F 3/048 | (2006.01) |
| H04N 7/16 | (2011.01) |

(52) U.S. Cl. .................. 726/5; 713/183; 726/9; 726/27; 715/748; 715/780

(58) Field of Classification Search ........................ None  
See application file for complete search history.

(56) References Cited

U.S. PATENT DOCUMENTS

| | | | |
|---|---|---|---|
| 5,646,997 A | 7/1997 | Barton | |
| 5,664,099 A | 9/1997 | Ozzie et al. | |
| 6,018,724 A | 1/2000 | Arent | |
| 6,331,865 B1 | 12/2001 | Sachs et al. | |
| 6,782,478 B1 | 8/2004 | Probert | |
| 6,823,359 B1 * | 11/2004 | Heidingsfeld et al. | 709/203 |
| 7,631,191 B2 | 12/2009 | Glazer et al. | |
| 2005/0268100 A1 | 12/2005 | Gasparini | |
| 2005/0268101 A1 | 12/2005 | Gasparini | |
| 2005/0268107 A1 | 12/2005 | Harris | |
| 2006/0185021 A1 * | 8/2006 | Dujari et al. | 726/27 |
| 2007/0277233 A1 * | 11/2007 | Bodin et al. | 726/9 |
| 2008/0141141 A1 * | 6/2008 | Moore et al. | 715/748 |
| 2008/0301460 A1 * | 12/2008 | Miller et al. | 713/183 |
| 2009/0144649 A1 * | 6/2009 | Strode et al. | 715/780 |

FOREIGN PATENT DOCUMENTS

| | | |
|---|---|---|
| EP | 0982927 | 3/2000 |
| JP | 1998/313308 | 11/1998 |
| WO | 9704394 | 2/1997 |

OTHER PUBLICATIONS

J.D. Tygar and Alma Whitten, "WWW Electronic Commerce and Java Trojan Horses," Proceedings of the Second USENIX Workshop on Electronic Commerce, Oakland, California, Nov. 1996.

* cited by examiner

*Primary Examiner* — Shin-Hon Chen  
(74) *Attorney, Agent, or Firm* — Banner & Witcoff, Ltd; Michael A. Springs (57) ABSTRACT

A reusable authentication component may be integrated into a web page to communicate with an authentication server and authenticate a user to the web page. The reusable authentication component may implement a complex authentication process, including multiple user interfaces to receive multiple assurances of user identity and user confirmation of previously stored mutual authentication data. The authentication process may be performed by the authentication component without refreshing or redirecting the parent web page until completion of a successful user authentication, after which the parent web page may receive authentication data and refresh to provide user specific and/or secure user data on the web page.

20 Claims, 9 Drawing Sheets

FIG. 6

REUSABLE AUTHENTICATION EXPERIENCE TOOL

FIELD OF THE TECHNOLOGY

Aspects of the disclosure generally relate to providing web content to a user and authenticating the user to a web page based on interaction between the user and a reusable authentication component.

BACKGROUND

The convenience of instant accessibility from nearly every corner of the world makes web sites and web-based applications powerful tools in today's economy. However, providing for user security is of utmost importance for many of these sites and applications. The ready accessibility of Internet resources opens the door to a significant risk of user spoofing and identity theft by malicious users, as well as phishing web sites that seek to take advantage of unsuspecting users and fraudulently obtain their user credentials. Thus, an effective user authentication system is an important tool that allows users and web content providers to confirm each other's identities.

Conventional authentication systems implemented on web pages often only require the user to enter a user identifier (user ID) (e.g., login, account number, or online ID) and a password. In such systems, the user will enter a user ID and password onto an authentication web page and submit the web page. The server receives and verifies the user ID and password combination before providing the user with access to the requested resource. However, conventional user ID and password systems are ineffective against malicious users that have acquired a valid user ID and password. These systems also fail to address the problem of phishing web sites that lure users into entering their user ID and password credentials into a spoofed web site that is designed to look like an authentic secure site.

More recently, systems motivated by the ineffectiveness of conventional user ID and password schemes and/or affected by new Internet authentication regulations that have been adopted in several countries, have begun to implement multi-factor authentication. Multi-factor authentication typically requires additional assurances of a user's identity before the user is authenticated to a web site. These additional assurances may include authentication process steps that are either visible or transparent to the user. As an example, a multi-factor authentication system may require a user ID and password as in conventional systems, but may also require that the IP address of the user's computer is recognized from a previous successful login by the user, or that the user answers a challenge question. Multi-factor authentication may also involve storing 'mutual authentication data' at the authentication server that can be provided to the user to allow the user to confirm that the web site is not a fraudulent or phishing site.

Although multi-factor authentication systems may provide additional security for users and web content providers, these systems are often complicated and costly to implement and may negatively affect the user experience. For example, multi-factor authentication which requires several successive data exchanges between the server and client may force the client application (e.g., an Internet browser window) to refresh multiple different times during the authentication process, causing delays and frustrating the user experience. Furthermore, the implementation of multi-factor authentication systems and the integration of these systems into existing web pages may pose substantial costs since the web-based applications may require a large amount of additional software that must be integrated into the existing web pages, and a significant effort in software development and testing may be required to verify the new authentication system. This process may also detract from the consistent look and feel of the web site, and may negatively affect the overall appearance by attempting to mesh the new authentication user interface components into the architecture and style of the previously implemented web site.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

According to one aspect of the present disclosure, a reusable authentication component is provided on a web page to authenticate a user to the web page. The reusable authentication component may be implemented as a widget or other software component provided by an authentication server. The authentication server may receive data via the authentication component to confirm the identity of the user, for example, an IP address or other computer identifier, a user ID and password, and/or answers to challenge questions associated with an identified user. The authentication component may also provide mutual authentication data to allow the user to confirm the legitimacy of the authentication server. According to another aspect of the present disclosure, the user interface of the reusable authentication component may be updated during the authentication process without refreshing the parent web page. After a valid user has been successfully authenticated using the reusable authentication component, the web server may then refresh (or redirect) the parent web page to provide user data, such as secure financial or personal data within an online banking site or other secure web site.

According to another aspect of the present disclosure, a client computer providing a web page may receive web content from a web server and a reusable authentication component from an authentication server separate from the web server. The client computer may instantiate the authentication component by invoking a function call, including authentication parameters, embedded within the web page content. The client may display the web page including the customized instantiation of the authentication component based on the function call and parameters. The client computer may communicate with the authentication server, rather than the web server, to transmit and receive user authentication data for authenticating a user. After the user has been authenticated, the client computer may the signal the web server to provide updated user specific data for the authenticated user. For example, the parent web page may be prompted to refresh the page and provided a user identifier, so that the web server may retrieve and integrate the user data into the web page, for example, by automatically populating form user input fields with retrieved user data, or by initiating an encrypted connection and logging in the authenticated user to a secure website, such as, for example, an online banking web site or merchant web site.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
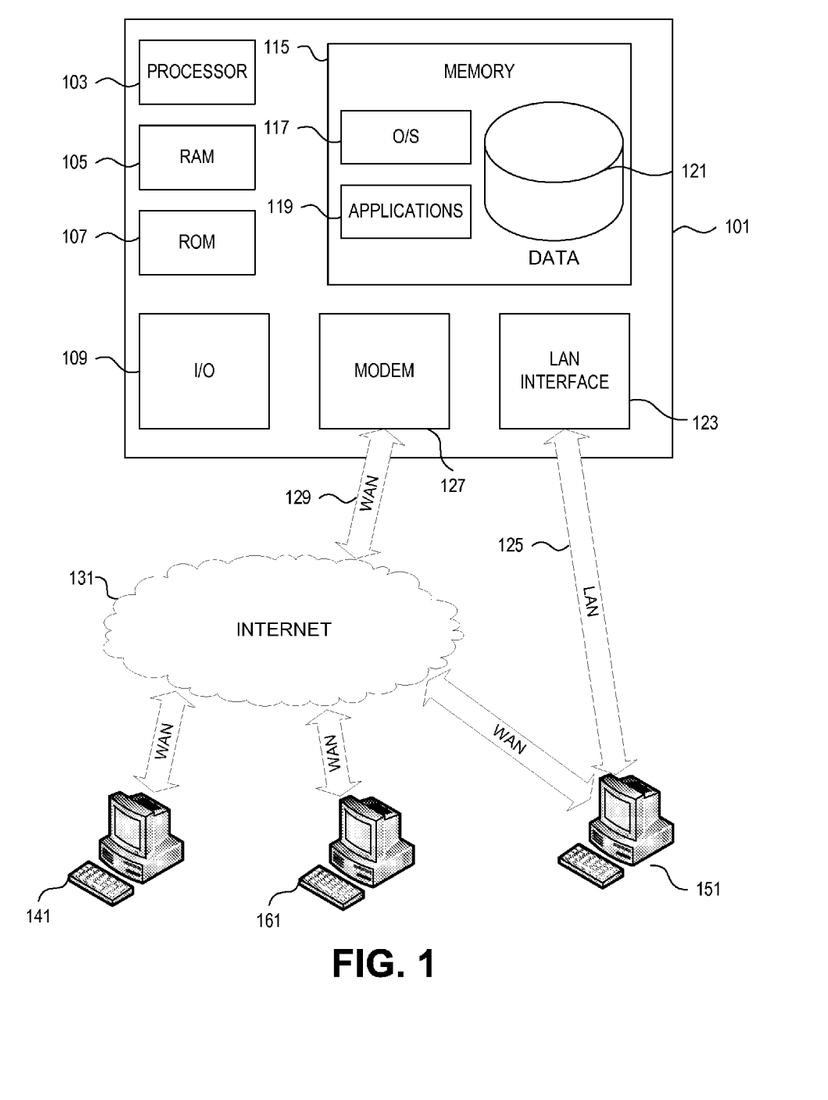
FIG. 1 is a block diagram illustrating a computing device and network, in accordance with aspects of the present invention.

FIG. 1 illustrates a block diagram of a generic computing device 101 (e.g., a client desktop or laptop computer, a mobile device, a computer server such as a web server, a data store providing services, etc.) that may be used according to an illustrative embodiment of the invention. The computer 101 may have a processor 103 for controlling overall operation of the server and its associated components, including RAM 105, ROM 107, input/output module 109, and memory 115.

I/O 109 may include a microphone, keypad, touch screen, and/or stylus through which a user of the computer 101 may provide input, and may also include one or more of a speaker for providing audio output and a video display device for providing textual, audiovisual and/or graphical output. Software may be stored within memory 115 and/or storage to provide instructions to processor 103 for enabling computer 101 to perform various functions. For example, memory 115 may store software used by the computer 101, such as an operating system 117, application programs 119, and an associated database 121. Alternatively, some or all of the computer executable instructions in computer 101 may be embodied in hardware or firmware (not shown). As described in detail below, the database 121 may provide centralized storage of account information and account holder information for the entire business, allowing interoperability between different elements of the business residing at different physical locations.

The computing device 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the invention may include computer executable instructions for invoking user functionality related to communication, such as email, short message service (SMS), and voice input and speech recognition applications.

Figure 2:
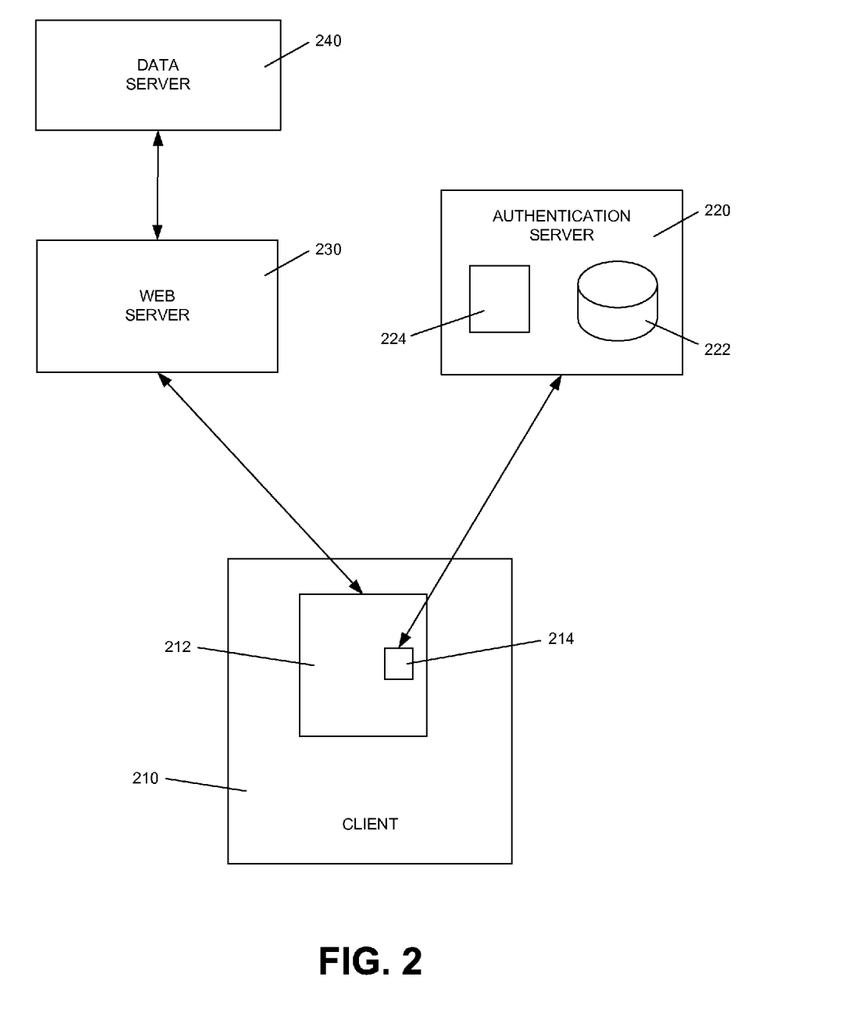
FIG. 2 is a block diagram showing illustrative components in a system for authenticating a user to a website, in accordance with aspects of the present invention.

Referring to FIG. 2, a component diagram is shown of an illustrative system used to authenticate a user on a website. In this example, a client 210 loads a web page 212 containing an authentication component 214. The client 210 may be, for example, a desktop or laptop computer with a browser software application, a mobile device or mobile phone with Internet capability, or any computing device from which a user can access web content. The content rendered on web page 212 is provided by a web server 230, for example, in response to a client web page request via the Internet 131. The web content received from web server 230 may comprise secure and/or non-secure data, and may be received by the client 210 via an HTTP communication protocol (e.g., via TCP port 80) or an HTTPS communication protocol (e.g., via TCP port 443). The web page 212 may also include one or more of the complex content types well known within the web development field, such as, dynamic pages, scripting objects, forms, and other embedded objects (e.g., applets and embedded code invoking plug-in object functionality).

The web page may 212 also contain an authentication component 214 provided by an authentication server 220. In this example, the authentication server 220 contains an authentication database 222 and configuration file 224 used to authenticate a user to the web page 212. The process of authenticating a user is described in detail below in reference to FIGS. 3A-3B. According to the diagram in FIG. 2, authentication data is communicated between the authentication server 220 and component 214 via one or more communication protocols (e.g., HTTP, HTTPS). These protocols may or may not be the same protocols used in communications between the client 210 and web server 230. Although at least some of the data for the authentication component 214 in web page 212 is provided by the authentication server 220, other authentication content related to the component (e.g., an authentication framework, code comprising function calls to the authentication server and/or API, component style, size and positioning, etc.) may be provided by the web server 220. As described in the examples below, the authentication component 214 may be an authentication 'widget,' a well known term of art corresponding to a visual control of a graphical user interface that includes the underlying functionality associated with the visual control. However, it should be understood that the present invention applies not only to widgets, but also to any other type of reusable authentication component that can be deployed within a web page. Thus, certain embodiments may use code blocks, functions, macros, and other software components of various languages to implement an authentication component 214 on a web page 212.

Figure 5:
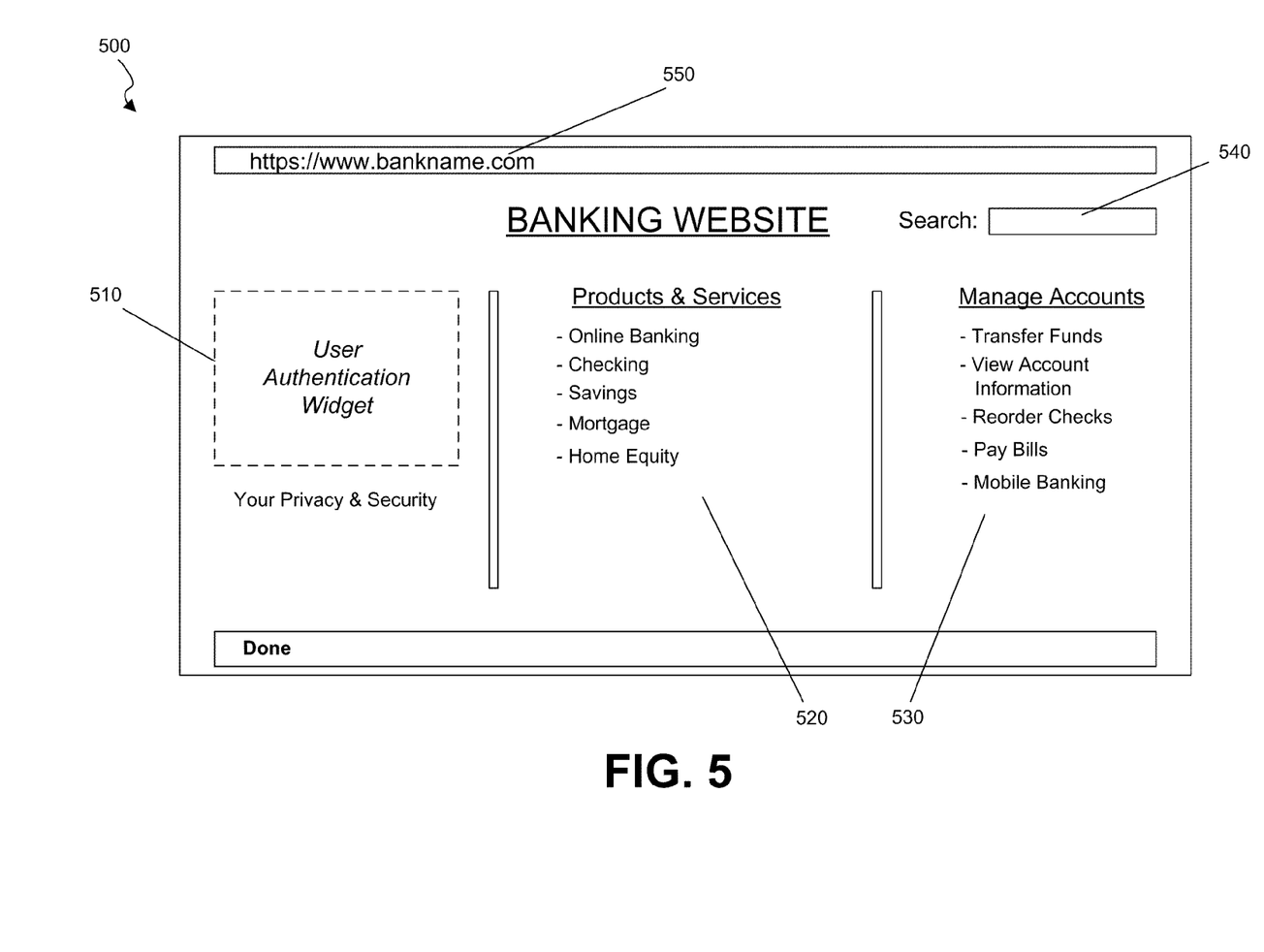
FIG. 5 is an illustrative user interface diagram of a banking website user interface including a user authentication widget, in accordance with aspects of the present invention.

Additionally, in this example, the authentication server 220 and the web server 230 are different computers, which may be in different networks and may be controlled and maintained by different entities. For instance, as described below in reference to FIG. 6, the authentication server 220 may be associated with a financial institution that provides an authentication widget 610 to be displayed on a web page 600 that is provided by an online merchant web server 230. However, in other examples, the authentication server 220 and the web server 230 may be a single server. For example, as shown in FIG. 5 and similar scenarios, the entity responsible for authenticating the user (e.g., a financial institution) may be the same entity providing the web page 212 (e.g., online banking web site 500). In other examples, the authentication server 220 and the web server 230 may also be different servers in the same network, for example, computers in a single domain controlled by the same entity and within a single LAN 125. The authentication server 220 also may be an authentication service, or an application program running as a background process on another server (e.g., web server 230 or a different remote server).

Figure 3A:
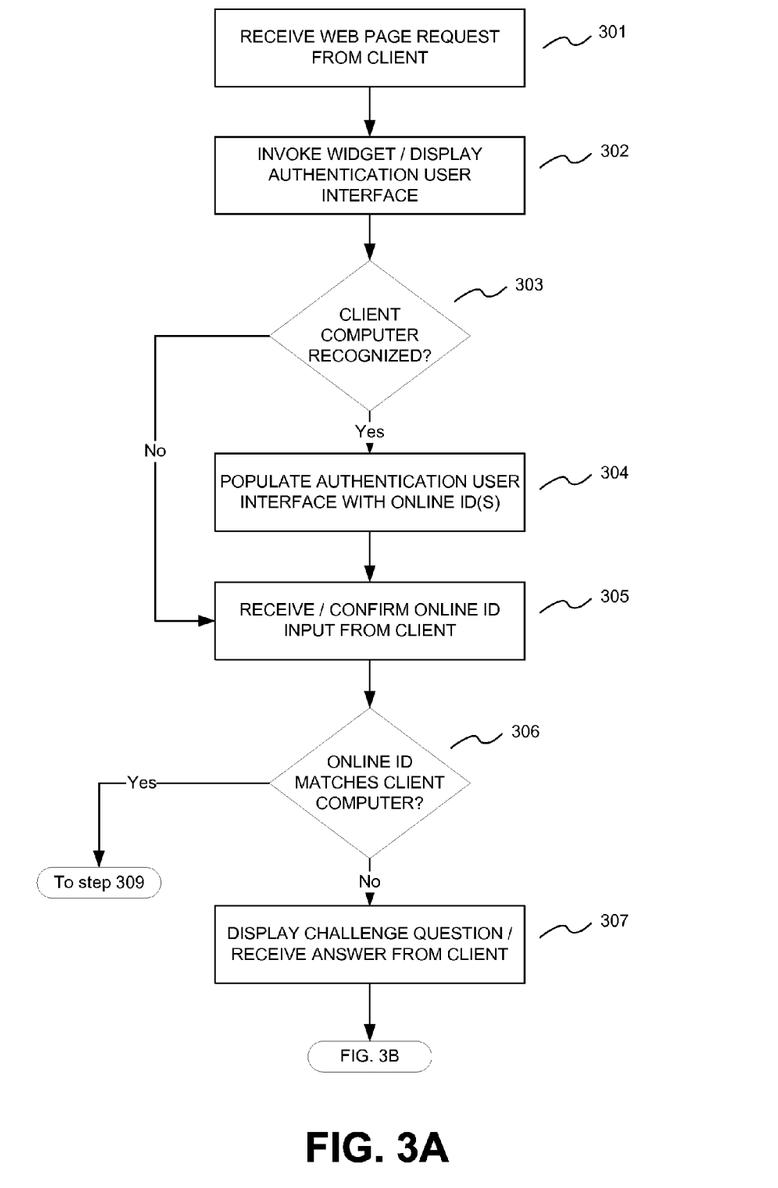
FIGS. 3A and 3B are a flow diagram showing illustrative steps for authenticating a user to a website, in accordance with aspects of the present invention.
Figure 3B:
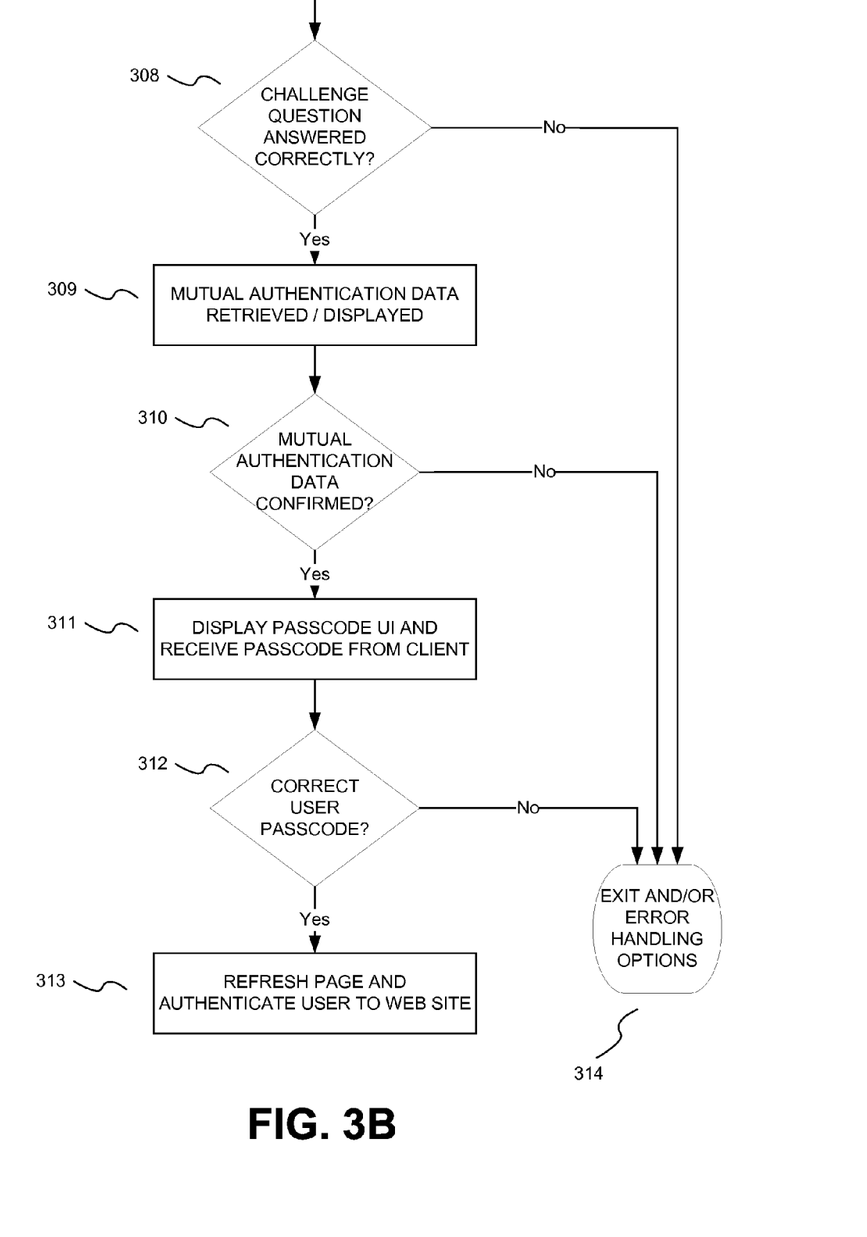

Referring to FIGS. 3A and 3B, an illustrative flow diagram is shown in which a web site comprising one more web pages provides an authentication user interface to authenticate a user attempting to access the site. As an example, the steps of FIGS. 3A and 3B may be described in reference to the illustrative component architecture of FIG. 2, in which a client computer 210 loads a web page 212 via a web server 230, and receives and integrates an authentication component 214 into the web page 212 via an authentication server 220.

In step 301, a web page 212 is requested and loaded on a client computer 210. In this step, a user of the client computer 210 may request (e.g., via an Internet browser application) a web page by entering a uniform resource locator (URL) into the active web browser. In response to the request, web content corresponding to the web page 212 may be returned from the web server 230 and rendered on the client computer 210. In this example, the received web content contains authentication content for invoking a user authentication component 214 and integrating the component 214 into the web page 212. That is, as described above, the web page 212 may contain one or more separate regions (e.g., an IFRAME, set of INCLUDE tags, or other designated regions within the web page 212) or objects (e.g., scripting language code, applets, or other embedded objects) that when loaded by the client browser, initiate communication with the authentication server 220. As an example, the web page 212 received from web server 230 may include an IFRAME tagged region which includes a code for invoking an authentication widget 214 from the authentication server 220 to be rendered in the region of page 212 defined by the IFRAME. In this example, the client 210 may initiate the request to the authentication server 220 for the authentication widget 214 during or shortly after receiving and loading the web page 212, so that the authentication widget 214 may be received from the authentication server 220 at approximately the same time as the other web content from the web server 230. In other examples, rather than hosting the authentication widget 214 within an IFRAME, the authentication widget 214 may be implemented by embedding a shared object within the web page 212, or by including scripting language code within the web page 212 which invokes an XMLHTTPRequest object to handle communication with the authentication server 220.

Figure 4A:
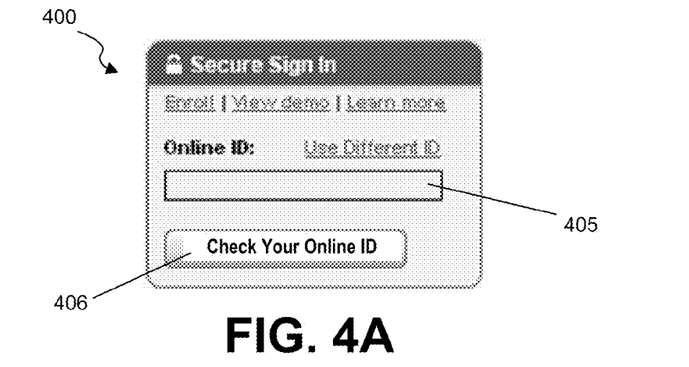
FIGS. 4A-4H are illustrative screenshots of one or more authentication user interfaces, in accordance with aspects of the present invention.

In step 302, the authentication widget 214 associated with the requested web page 212 is invoked (e.g., received from server 220 and instantiated by the client 210), and the corresponding authentication user interface is presented to the user within the web page 212. An illustrative user interface 400 corresponding to an authentication widget 214 is shown in FIG. 4A. User interface 400 includes the user interface components defined by the authentication widget 214, in this example, an online ID text box 405 and submit button 406 to allow the user to provide his or her user identifier (e.g., login) to the widget 214.

As described above, in this example, the layout and components of user interface 400 are determined by the authentication widget 214 received from the authentication server 220. However, the code that invokes the authentication widget 214, and determines certain display and functional characteristics of the widget 214 may be provided by the web server 230 within the web page 212. For instance, as shown in FIG. 2, the web page author has chosen to position the user authentication widget 214 is in the left column of the web page 212. Additionally, the web page author may be able to control the positioning, shape, size, component layout, color palette, and other properties of the widget 214, by invoking the authentication widget 214 via a function call using the desired parameter values associated with the widget 214. However, in certain embodiments, an authentication widget 214 may restrict the rendering options available to the web page 212, for example, to a pre-selected limited number of sizes, shapes, layouts, etc. For example, the widget 214 might only be supported in two layout shapes, horizontal and vertical, and might have a minimum size requirement (e.g., a minimum height or width in pixels) for display on the web page 212.

In step 303, a determination is made whether the client computer 210 is recognized, for example, from a previous successful login attempt by the client computer 210 to the same web page 212 (or another web page within the same web site/domain of the web server 230). For example, a network address (e.g., IP address) of the client computer 210 may be stored in a database 222 within, or accessible to, the authentication server 220. The database may contain a table of network addresses and the corresponding user credentials (e.g., user IDs, account numbers, online IDs). For security reasons, additional user information including passwords may be stored in a different and more secure database 222. In other examples, client cookies may be used to determine whether a client computer 210 or a specific user that has previously visited the web page 212.

Although FIG. 3 shows step 303 as a separate logical step after the invocation of the authentication widget 214, it should be understood that the authentication server 220 may make this determination before, during, or after it provides the authentication widget 214 to the client computer 210. For instance, the request by the web page 212 for an authentication widget 214 may include a client terminal identifier that may be used by the authentication server 220 to query the database 222 before providing the widget 214. In other examples, the client 210 may first receive and instantiate the authentication widget 214, after which the widget 214 attempts to identify the client 210 and transmits the client identification information to the authentication server 220. In other examples, the web server 230, and not the authentication server 220 may determine whether or not the client is a recognized entity. In this example, the web server 230 may initially make this determination before or concurrently while the web page 212 is being rendered, and may then embed the client identification information (e.g., IP address or user ID) into the widget invocation call transmitted to the authentication server 220. In certain other examples, the client recognition of step 303 may be optional when implementing an authentication widget 214 or other reusable authentication components. For instance, steps 303 and 304 may be skipped, in which case a user interface similar to the interface 400 shown in FIG. 4A might be displayed every time a client 210 attempts to access the web page 212, regardless of whether the client terminal 210 or user has previously visited the web page/web site.

Returning to the example shown in FIG. 3, if the client computer 210 (or a user associated with the client computer 210) is recognized (303:Yes), then the user interface 400 displayed by the authentication widget 214 may be automatically populated with one or more online IDs or other pieces of client data in step 304. For example, if the client terminal 210 is recognized as being associated with a single user, then a user interface 400 similar to FIG. 4B may be displayed, in which the online ID text box 405 is automatically populated with the ID of the associated user. If the client terminal 210 is associated with multiple users (or multiple sets of credentials for a single user), then a user interface 400 similar to FIG. 4C may be displayed, in which the online ID text box 405 has been replaced with a drop down component 407 populated with multiple user online IDs. In both examples, the pre-populated online IDs shown in FIGS. 4B and 4C are partially obscured so that valid users may be able to identify their correct online ID while protecting the full online ID strings from discovery by malicious users who have obtained or are spoofing the client computer 210.

If the client terminal 210 or an associated user is not recognized (303:No), then the authentication user 400 interface may remain blank as in FIG. 4A, thus requiring the user to input their valid user credentials into the online ID text box 405. For example, in FIG. 4D, a user that was not initially recognized by the authentication widget 214 has typed in an online ID string into the online ID text box 405.

Figure 4B:
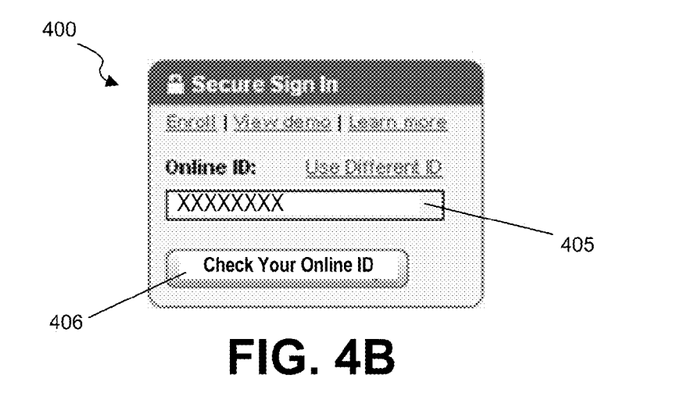
Figure 4C:
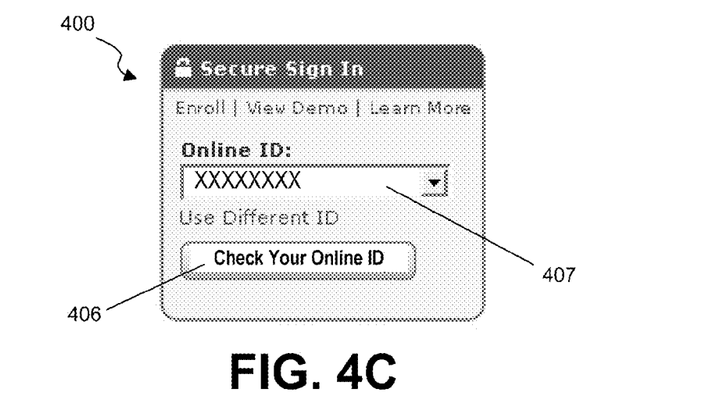
Figure 4D:
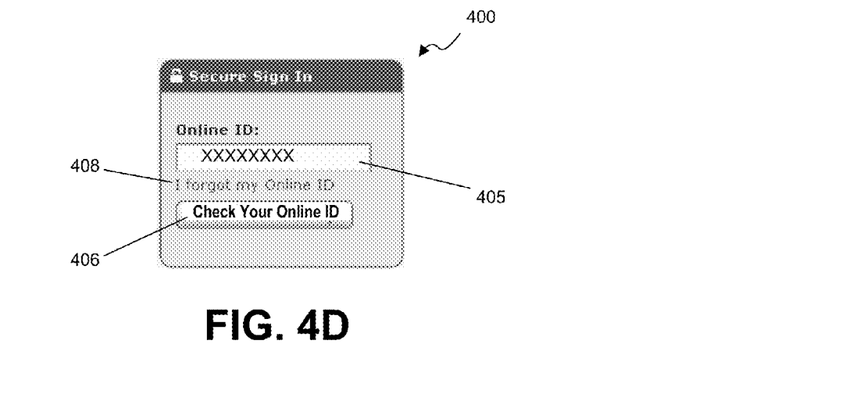

In step 305, once the user has input their user online ID, for example, by clicking the 'Check Your Online ID' button 406 in FIG. 4B, FIG. 4C, or FIG. 4D, the authentication widget 214 will submit the corresponding online ID to the authentication server 220. For instance, the widget 214 executing on the client computer 210 may initiate a secure network connection to an authentication service application running on the authentication server 220. As discussed above, in certain examples, the authentication server 220 and the web server 230 may correspond to different and/or unrelated entities, and also might not completely trust each other. Thus, the communication of user identification information from the client 210 to the authentication server 220 may be shielded from and secure with respect to the web server 230 and the organization providing the web page 212. As described below, similar other communications handled by the authentication widget 214 between the authentication server 220 and the client 210 may also be blocked from the web server 230. Thus, it may be possible for an authentication entity (e.g., a bank or financial institution) to authenticate a user and provide identity assurance to a third-party web page provider (e.g., an online merchant) without exposing the user's authentication credentials to the third-party and compromising the security of the user's credentials.

In other examples, the authentication server 220 and the web server 230 may correspond to the same entity and/or same web site and domain, for example, in a web page 212 authenticating a user to a banking website. In these examples, the communications between the client terminal 210 and the authentication server 220 via widget 214 might not need to be shielded from the web server 230.

It should also be noted that submitting user credentials (e.g., the user online ID) to the authentication server 220 in step 305 need not require refreshing or redirecting the parent web page 212. Since the authentication widget 214 may include the underlying code for controlling and modifying the widget's user interface 400, as well as the code for communicating with the authentication server 220 to transmit and receive user authentication data, neither the submission of user authentication data nor updating the widget user interface 400 requires that web page 212 be refreshed. For example, when an authentication widget is implemented within an IFRAME, only the IFRAME might be submitted rather than the web page 212. In other examples, for instance, non-IFRAME implementations, the authentication widget 214 may communicate with the authentication server 220 by transmitting (e.g., submitting) a request to post a form, or a request for an AJAX XMLHTTPRequest action to provide user credentials and receive authentication data from the authentication server 220.

After receiving the user authentication data (e.g., online ID) from the client 210 in step 305, and confirming that the online ID corresponds to a valid user, the authentication server 220 determines in step 306 whether the online ID is recognized as matching the client computer 210. In this example, when a user online ID received in step 305 is not recognized as matching the client computer 210, a challenge question is presented to the user in step 307, described below. To make the determination in step 306, the authentication server 220 may query an authentication database 222 and/or configuration file 224 storing all valid user online IDs known to the authentication server 220, along with a list of the corresponding client terminal information (e.g., IP addresses) for each user online ID. For example, if a user first authenticates to a web page 212 using his or her home personal computer, the IP address of the computer may be stored in database 222 so that on subsequent visits to the same web page 212, the authentication server 220 will recognize the personal computer as being associated with the returning user. In this example, when the online ID submitted by the user is recognized as matching the client computer 210 (306: Yes), the authentication server 220 may direct the authentication widget 214 to bypass the challenge question step 307, so that the user may potentially be authenticated more quickly. It should be understood that in other examples, other authentication schemes or combinations of authentication stages may be used. For instance, the challenge question of step 307-308 may be supplemented or replaced by possession of a digital certificate on the hard drive of the client computer 210 or on a local memory device (e.g., USB thumb drive, smart card, internal chip, etc.), or by other authentication steps.

Figure 4E:
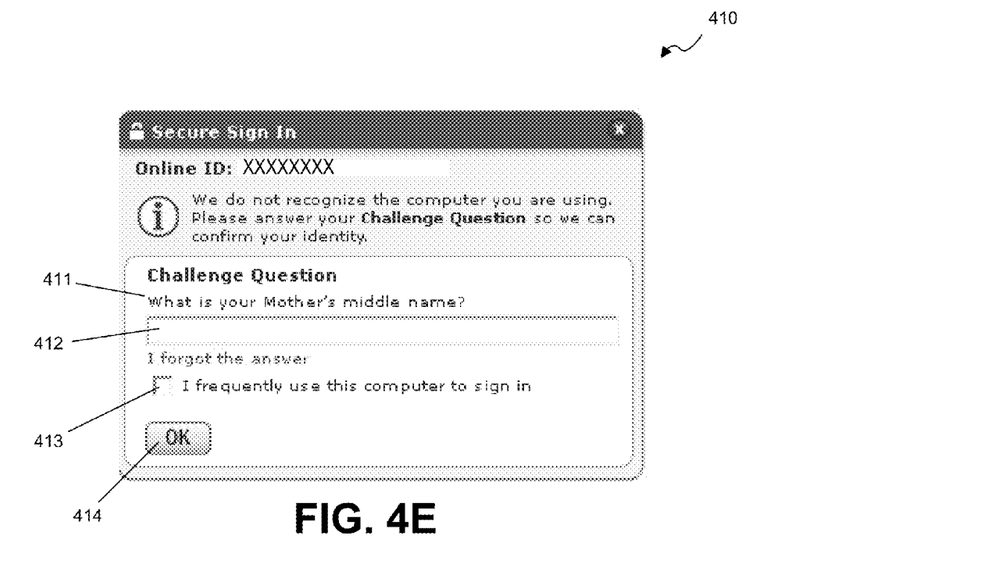

However, in this example, if the online ID submitted by the user is recognized as a valid user ID, but the user ID is not recognized as matching the client computer 210 (306:No), then a challenge question may be transmitted from the authentication server 220 to the authentication widget 214 and presented to the user in step 307. As shown in FIG. 4E, the authentication widget 214 has modified the authentication user interface 410 to display a challenge question 411 provided by the authentication server 220. The modified user interface is also configured to accept answer input in text box 412 and to submit the answer back to the authentication server 220 using button 414. As described above, presenting the modified user interface 410 within the web page 212 need not require refreshing or redirecting the web page 212, but may be performed solely within the authentication widget control 214.

The challenge question 411 provided by the authentication server 220 may be based on user account information (e.g., birthday, address, phone number) or may call for specific challenge question answers collected from the user when the user's account was first opened. In this example, the challenge question 411 asks, "What is your Mother's middle name?" The answer to this question may have been collected and stored by the authentication entity (e.g., bank or financial server) when the user's account was opened or when the user first signed up for online access with the authentication server 220 (e.g., using an online banking web site). The challenge question may relate to information about the user that is not public available or would not be readily accessible to invalid and malicious users. Thus, when receiving a correct answer to this question in step 308 (308:Yes), the authentication server 220 receives an additional measure of assurance that it is communicating with a valid user.

Referring again to FIG. 4E, when answering a challenge question 411, the user may select the checkbox 413 prior to submitting the answer to the authentication server 220. In this example, selection of the checkbox 413, along with a correct answer to the challenge question, indicates that the authentication server 220 should store data identifying the client terminal 210 and associating this terminal with the user credentials received in step 305. Thus, in subsequent login attempts, the client terminal 210 may be recognized as associated with the user online ID, and the authentication widget 214 may automatically populate the text box 405 or dropdown 407 of the authentication user interface 400 and may potentially dispense with the challenge question (steps 306-307) for quicker user authentication.

In other examples, if the checkbox 413 is not be present in the authentication user interface 410, the authentication server 220 may automatically store client terminal data and associated user data after every correct answer to a challenge question. Additionally, the authentication widget 214 may create or update a cookie on the client computer 210. In still other examples, the checkbox 413 might be absent and no client terminal data is stored, thus requiring the user to answer a challenge question for each authentication attempt to the web page 212.

Thus, upon reaching step 309 in this example, the authentication server 220 has received at least one measure of assurance that the user at the client computer 210 is a valid customer. That is, either the client terminal 210 corresponds to the user online ID received in step 305, or the user has correctly answered a challenge question in step 308. Then, in step 309, the authentication server 220 retrieves one or more pieces of mutual authentication data and transmits this data to the authentication widget 214 for rendering on the web page 212. Mutual authentication data refers to previously stored data that is accessible to the authentication server 220 and known to the user. Thus, when the authentication server 220 provides mutual authentication data to the user, the user may receive a measure of assurance that they are communicating with a valid authentication server 220, rather than a phishing web site or other malicious server. As described above, since the authentication widget 214 receives the mutual authentication data and presents the corresponding modified the user interface 420, the parent web page 212 need not be refreshed or redirected at step 309.

Figure 4F:
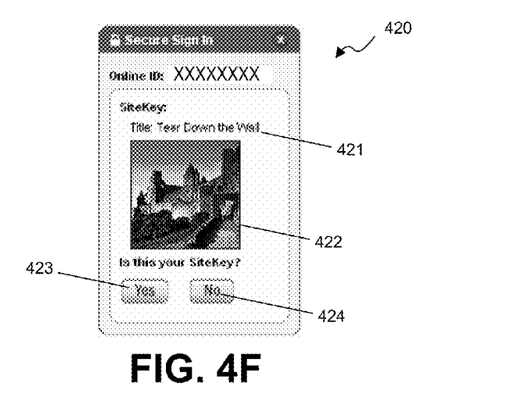
Figure 4G:
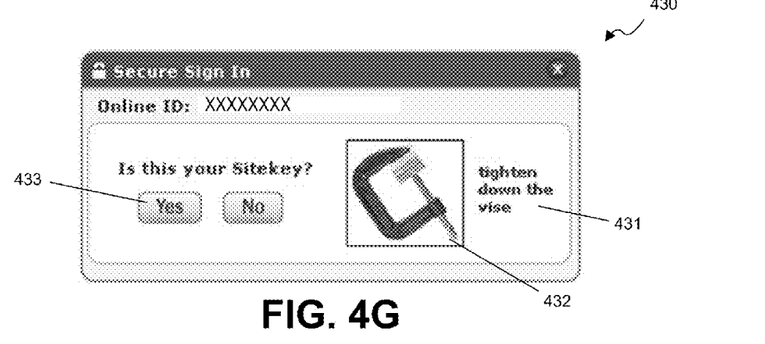
Figure 4H:
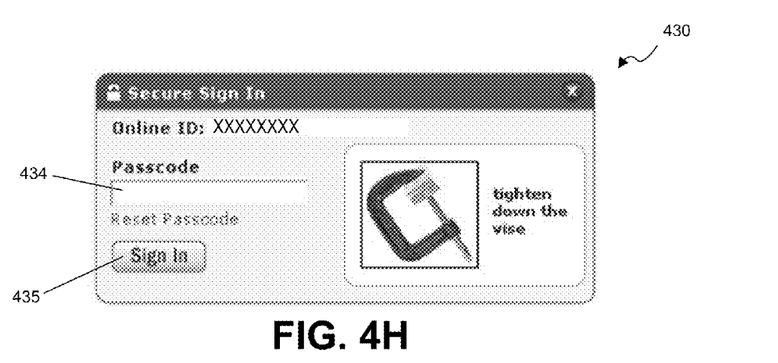

Examples of providing mutual authentication data using the SiteKey® security feature from the Bank of America Corporation® are shown in FIGS. 4F-4H. In FIG. 4F, corresponding to step 309, the authentication widget 214 displays a modified user interface 420 within the web page 212 including two pieces of mutual authentication data, a SiteKey® phrase 421 (Tear Down the Wall'), and a SiteKey® image 422 of a castle. In step 310, if the user recognizes these data as his chosen SiteKey® data (310:Yes), then he will confirm the data by clicking the 'Yes' button 423 in FIG. 4F. If the data shown is not the user's chosen SiteKey® data (310:No), then the user will click the 'No' button 424.

In FIG. 4G, in step 309 an alternative modified user interface 430 is rendered on the authentication widget 214, integrated into the web page 212, to display a different a SiteKey® phrase 431 (tighten down the vise') and a SiteKey® image of a vice 432. In this example, in step 310, the user recognizes this data as his previously selected mutual authentication data and clicks the 'Yes' button 433 (310:Yes). After the user confirms the mutual authentication data, the authentication user interface 430 is modified in step 311 to display a passcode text input box 434 and a 'Sign In' button 435 to allow the user to submit his passcode to the authentication server 220. In step 312, the passcode submitted by the user via the authentication widget 210 to the authentication server 220 is verified to confirm that it is the user's correct passcode. As described above, modifying the various user interfaces 400, 410, 420 and/or 430 of the authentication widget 214, all of which may be integrated into the web page 212, need not require refreshing or redirecting the parent web page 212. Since the authentication widget 214 may include the underlying code for controlling and modifying the widget user interfaces 400, 410, 420 and 430, as well as the code for communicating with the authentication server 220 to transmit and receive the various authentication data, the authentication process and user interface modifications may occur without the participation or knowledge of the web page 212.

In this example, in step 312 if the authentication server 220 confirms that the passcode provided by the client 210 is the user's correct passcode (312:Yes), then the authentication server 220 concludes that the user is a valid user and may then authenticate the user to the web page 212. Thus, in step 313, the authentication server 220 may prompt the authentication widget 214 (e.g., by providing a user identifier) to signal the web server 230 that the user has been successfully authenticated. For example, the authentication widget 214 may integrate with a known access management tool. Additionally, the authentication widget 214 may provide an option for integration with proprietary cookie based credential management or PKI based redirect identity forwarding approaches. Thus, for instance, after the authentication server's 220 portion of the authentication process is complete, the server 220 may provide a response back to the widget 214 and may add a session cookie to the HTTP header variables of the response in accordance with one of the above techniques. In this example, the browser application running on the client computer 210 may consume the cookie, so that when the authentication widget 214 invokes a page refresh, the cookie credentials may be provided to the hosted web page 212.

In certain examples, the authentication server 220 may create a session object in accordance with the SiteKey® security system of Bank of America Corporation®, and then transmit the session object to the authentication widget 214. The authentication widget 214 may then communicate the authenticated state to the parent web page 212, and prompt the web page 212 to refresh (or redirect to a different URL) based on a user identifier that the web server 230 can retrieve from the session object (or other credential management session object in accordance with an access management tool). For example, if the authentication widget 214 is implemented using an IFRAME, then the IFRAME may execute a small scripting language function, such as 'window.parentlocation.href=window.parentlocation.href;'. Once receiving confirmation of the user's identity, the web server 230 may access user data stored locally, or may retrieve user data from a remote source (e.g., data server 240 or authentication server 220) based on the content of the web page 212.

If the web page 212 relates to and provides secure data, such as personal user information, secure online transactions, banking statements, financial records, etc., then the refreshed web page 212 may now more confidently provide secure data to the user that was not presented prior to the successful user authentication. For example, refreshing the web page 212 for an online banking website may initiate a secure connection (e.g., HTTPS) between the client computer 210 and the web server 220 and may automatically log the user in to the home page of their secure online account. However, establishing a user's identify during the authentication process described above may have additional uses and advantages besides only providing the user with access to secure data. For example, if the web page 212 comprises a form with one or more user input fields, then successful authentication of the user may allow the web server 230 to retrieve the appropriate user data and automatically populate the form fields. Thus, user authentication may potentially allow for more efficient user interaction with forms and web-based applications. In other examples, authentication of a user's identity may enable the web server 230 to retrieve and display user-specific information to customize the web page 212, such as rendering the content of the web page 212 or its layout based on user preferences, or providing targeted advertisements based on available user information.

Furthermore, the authentication widget 214 may be configured to provide varying levels of security depending on the content of the web page 212 and the potential uses for the authentication process. For example, as mentioned above, a non-secure web page 212 comprising a web form that calls for publicly available user data might only use the authentication widget 214 to allow the user to quickly populate the web form fields. In this example, the authentication widget 214 might implement a lower level of security, for instance, by requiring only a single assurance of the user's identity, or by not requiring the presentation and confirmation of the mutual authentication data. In other examples in which the web page 212 may present confidential user data or access more secure resources (e.g., an online banking site), the authentication widget 214 may implement a higher level of security, for instance, by requiring multiple assurances of the user's identity and mutual authentication data and/or by more tightly restricting wrong answers and failed login attempts to provide a less error tolerant authentication process.

Referring to step 314, if the user authentication is unsuccessful at any of the steps 308, 310, or 312, the authentication widget 214 and authentication server 220 may implement a variety of error handling techniques. For example, if the user submits an incorrect passcode (e.g., one or more times) in step 312, or an incorrectly answers a challenge question (e.g., two or more times) in step 308, then the authentication server 220 may flag the user's account for possible fraud and/or temporarily disable the account preventing online authentication. The authentication widget 214 may also prompt the user to contact the authentication entity (e.g., bank or financial institution). As another example, one or more authentication attempts with an invalid passcode in step 312 may prompt the authentication server 220 to delete the user data and/or associated client terminal data stored in database 222, thus requiring the user to answer a challenge question on a subsequent authentication attempt. In other examples, one or more failed authentication attempts may prompt the authentication server 220 and widget 214 to request (or require) that the user change online IDs or passcodes. The error handling procedures employed in these examples may depend on the security policies of the client 210, authentication server 220 and/or web server 230, with regard to the number of failed attempts permitted and the actions taken following a failed authentication attempt. In certain embodiments, the web page 212 may invoke the authentication widget 214 with security parameters that determine how failed authentications are to be handled.

Referring to FIG. 5, an illustrative diagram is shown representing a user authentication widget 510 on a web page 500 of a financial institution ("Bank ABC"). In this example, the user authentication widget 510 is integrated within the other web page components provided on the Bank ABC web site 500, such as links 520-530 to the products and services provided by the bank and the web site search component 540. A uniform resource locator (URL) 550 indicates that hypertext transfer protocol over secure socket layer (HTTPS) and TCP port 443 are used on Bank ABC's web site 500 to provide encrypted communication and an additional layer of authentication. However, in other examples, an authentication user interface such as widget 510 may be provided on a web site using the hypertext transfer protocol (HTTP) and TCP port 80.

Figure 6:
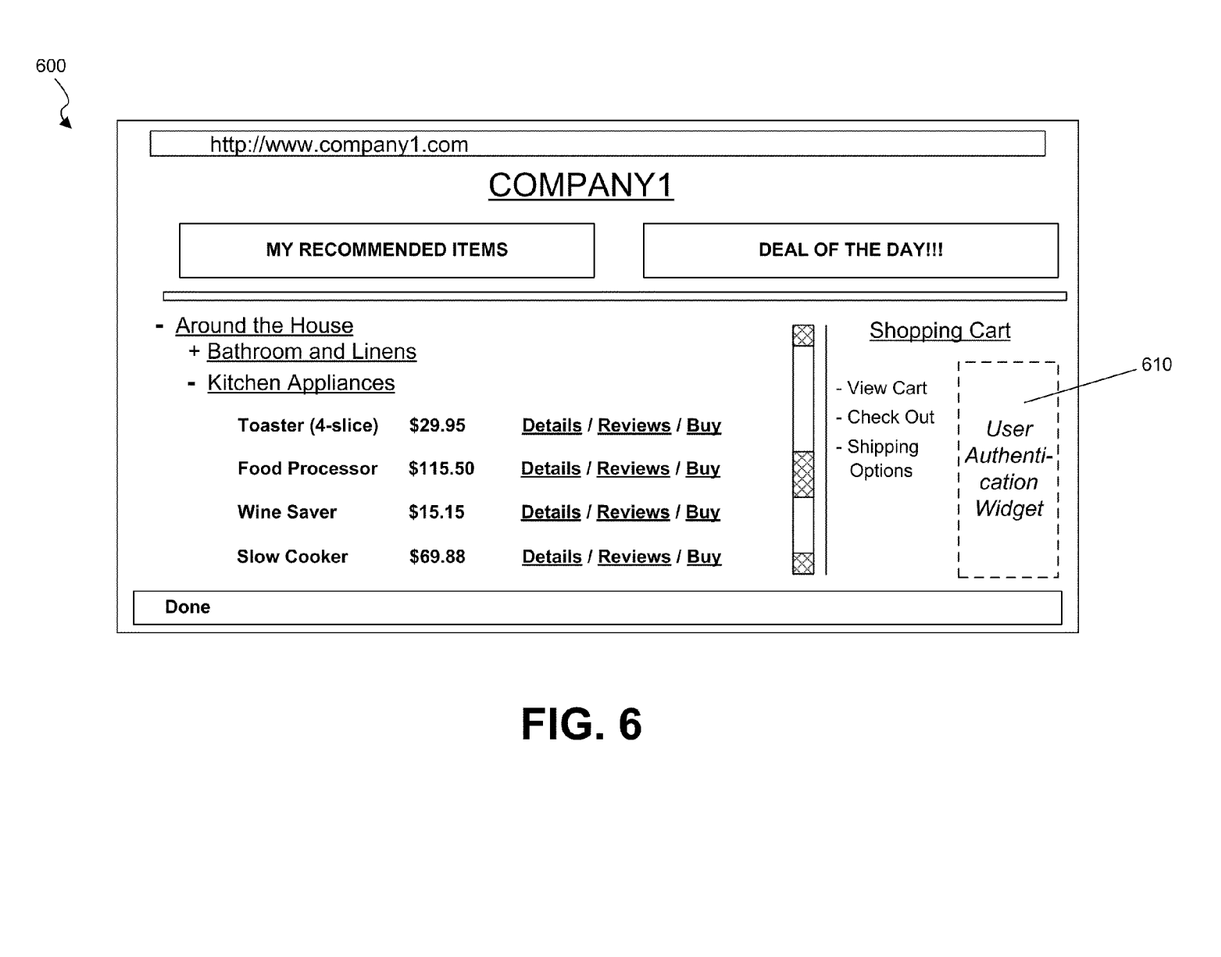
FIG. 6 is an illustrative user interface diagram of a merchant website user interface including a user authentication widget, in accordance with aspects of the present invention.

Additionally, although this example refers to a banking web site 500, in other examples, embodiments of an authentication user interface may be applied to other types of web sites or other network locations that authenticate users or provide secure access to network resources. For example, in other embodiments, an authentication user interface component (e.g., widget 510) may be used with or integrated into web sites of other financial institutions and credit providers, web sites of online merchants, and systems providing secure remote login capabilities (e.g., secure email systems, corporate, educational, and governmental systems). For instance, as shown in FIG. 6, an authentication widget 610 may be requested by and integrated into a third-party web page 600 (e.g., ABC Online Merchant). In this example, the web page 600 is provided by the online merchant, while the authentication widget 610 may be associated with a separate entity (e.g., Bank ABC or other financial institution), thus allowing users to authenticate themselves using the authentication entity in order to access user-specific data (e.g., secure data) from the ABC Online Merchant web page 600. For instance, after the authentication widget 610 successfully authenticates the user, the widget 610 may signal the parent web page 600 of the authenticated user's identity, allowing the web page to refresh or redirect to automatically populate user interface components, such as, for example, the user's address and credit card information prior to making a purchase on the web site 600.

As described above, the shape, color scheme, size, position within the user interface window 500 or 600, and other characteristics of the authentication widget 510 or 610 may be customizable for an easier and more seamless integration into the web site. For example, the authentication widget 510 may be instantiated using a function call within a set of IFRAME tags, or positioned based on other components of the web page 500, so that the author of the web page 500 may control the location within the web page where the authentication widget 510 is instantiated. Additionally, the authentication widget 510 may support function parameters allowing the web page 500 to control other characteristics of the authentication widget 510. In certain examples, an authentication server 220 may support a reusable authentication widget implementation with the parameters and defaults described in Table 1 below:

TABLE 1

Example Widget Parameters

| Parameter | Default Value |
| --- | --- |
| Horizontal or Vertical Widget | Horizontal |
| Enroll Link | On |
| Enroll Link URL | — |
| Enroll Link Title | — |
| View Demo Link | On |
| View Demo Link URL | — |
| View Demo Link Title | — |
| Learn More Link | On |
| Learn More Link URL | — |
| Learn More Link Title | — |
| Forgot ID Link | On |
| Forgot ID Link Behavior | Depart |
| Reset Passcode | On |
| Reset Passcode Behavior | — |
| Reset Passcode Message Text | — |
| Save Online ID Component | Visible |
| Color Palette | — |
| Landing Page | — |
| Widget Expansion Behavior | Horizontal |
| Customer Choice Landing Page Cntl | On |
| Optional Landing Pages and URLs | — |
| Enable Strong Security (OTP) | No |
| Page Allignment Within Frame | — |
| Bank Logo Displayed (external sites) | Off |

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

The invention claimed is:

1. A method of authenticating a user to a web site, the method comprising:
   providing, by a first server, an authentication user interface as an integrated component of a web page of a second web server different from the first server;
   receiving via the authentication user interface a first piece of client authentication data;
   identifying an authorized user based on the received first piece of client authentication data; and
   providing an updated authentication user interface comprising additional user interface data based on the received first piece of client authentication data, wherein the updated authentication user interface is provided without refreshing the web page.

2. The method of claim 1, wherein providing the authentication user interface comprises transmitting a reusable widget control to a client computer.

3. The method of claim 1, wherein at least one of the size, position, and color of the authentication user interface is determined by the web page provided by the second web server and not the first server.

4. The method of claim 1, wherein the first piece of client authentication data is not accessible to the web page provided by the second web server.

5. The method of claim 1, wherein identifying the authorized user comprises identifying a computer used by the authorized user based on at least one of an IP address or client cookie associated with said computer.

6. The method of claim 1, wherein the updated authentication user interface comprises mutual authentication data associated with the authorized user and stored during a previous interaction with the authorized user.

7. The method of claim 6, wherein the mutual authentication data comprises at least one of a picture, sound, or text string previously selected by the authorized user.

8. The method of claim 1, further comprising:
   receiving via the updated authentication user interface a second piece of client authentication data;
   authenticating the authorized user based on the first and second pieces of client data; and
   providing the authenticated authorized user with access to secure resources via the web page.

9. The method of claim 8, wherein providing the authenticated authorized user with access to secure resources comprises one of transmitting data prompting a client computer to refresh the web page or transmitting data prompting a client computer to redirect the authorized user to another web page.

10. A method of authenticating a user to a web site, the method comprising:
    receiving data corresponding to web page content from a web server;
    receiving data corresponding to an authentication user interface from an authentication server different from the web server;
    displaying a web page comprising the web page content received from the web server, wherein the authentication user interface is integrated into the displayed web page;
    receiving client authentication data via the authentication user interface;
    transmitting the client authentication data to the authentication server;
    after transmitting the client authentication data, receiving an authentication confirmation corresponding to a valid user from the authentication server;
    in response to receiving the authentication confirmation, transmitting a signal to the web server to authenticate the valid user; and
    receiving updated web page content from the web server corresponding to a web page for the authenticated valid user.

11. The method of claim 10, wherein the signal transmitted to the web server prompts the web server to refresh the web page.

12. The method of claim 10, wherein receiving data corresponding to the authentication user interface comprises:

transmitting a request including display parameters for the authentication user interface; and receiving data corresponding to a reusable widget control customized based on the display parameters.

13. The method of claim 10, wherein the updated web page content comprises secure data corresponding to the authenticated valid user.

14. The method of claim 10, wherein the received web page content comprises a web form including one or more user input fields, and wherein the updated web page content comprises data for populating the one or more user input fields of the web form based on the authenticated valid user.

15. A computing device configured to authenticate a user to a web site, the computing device comprising:

a processor controlling at least some operations of the computing device; and a memory storing computer executable instructions that, when executed by the processor, cause the device to perform a method comprising:

providing, by the computing device, an authentication user interface as an integrated component of a web page of a web server different from the computing device;

receiving via the authentication user interface a first piece of client authentication data;

identifying an authorized user based on the received first piece of client authentication data; and providing an updated authentication user interface comprising additional user interface data based on the received first piece of client authentication data, wherein the updated authentication user interface is provided without refreshing the web page.

16. The computing device of claim 15, wherein providing the authentication user interface comprises transmitting a reusable widget control to a client computer.

17. The computing device of claim 15, wherein the updated authentication user interface comprises mutual authentication data associated with the authorized user and stored during a previous interaction with the authorized user.

18. The computing device of claim 15, the method further comprising:

receiving via the updated authentication user interface a second piece of client authentication data;

authenticating the authorized user based on the first and second pieces of client data; and providing the authenticated authorized user with access to secure resources via the web page.

19. The computing device of claim 18, wherein providing the authenticated authorized user with access to secure resources comprises one of transmitting data prompting a client computer to refresh the web page or transmitting data prompting a client computer to redirect the authorized user to another web page.

20. A computing device configured to authenticate a user to a web site, the computing device comprising:

a processor controlling at least some operations of the computing device; and a memory storing computer executable instructions that, when executed by the processor, cause the device to perform a method comprising:

receiving a request for an authentication component from a web page providing by a web server and loaded on a client computer;

parsing a requested set of component parameters from the request;

transmitting code corresponding to an authentication widget based on the requested set of component parameters;

receiving via the authentication widget a first piece of client authentication data identifying a valid user;

transmitting to the authentication widget a second piece of mutual authentication data;

receiving via the authentication widget a password associated with the valid user;

initiating an authentication session object corresponding to the valid user;

providing access to the authentication session object to the client computer via the authentication widget; and transmitting to the authentication widget data prompting the client computer to request the web server to refresh the web page and provide the web server with the data corresponding to the authentication session object.

* * * * *